United States Patent [19]

Matsuda et al.

[11] Patent Number: 5,037,018
[45] Date of Patent: Aug. 6, 1991

[54] AUTOMATIC FEEDER

[75] Inventors: Takumi Matsuda; Keiichi Yoshizawa, both of Tokyo, Japan

[73] Assignee: Seikosha Co., Ltd., Japan

[21] Appl. No.: 364,263

[22] Filed: Jun. 9, 1989

[30] Foreign Application Priority Data

Jun. 10, 1988 [JP] Japan .............................. 63-77021[U]
Mar. 14, 1989 [JP] Japan .............................. 1-28581[U]

[51] Int. Cl.⁵ .............................................. B67D 5/64
[52] U.S. Cl. .................................... 222/650; 222/171; 222/456
[58] Field of Search ............... 222/650, 170, 652, 353, 222/305, 299, 456, 171

[56] References Cited

U.S. PATENT DOCUMENTS

| | | | |
|---|---|---|---|
| 2,847,066 | 8/1958 | Kleiber | 222/650 X |
| 2,956,711 | 10/1960 | Mortara et al. | 222/170 |
| 2,978,148 | 4/1961 | Schwartz | 222/650 X |
| 3,031,984 | 5/1962 | Esmay | 222/171 X |
| 3,043,479 | 7/1962 | Gaukstern | 222/650 X |
| 3,091,371 | 5/1963 | Marx | 222/650 X |
| 3,484,025 | 12/1969 | Capalia | 222/456 |
| 3,578,209 | 5/1971 | Fraser | 222/650 X |

FOREIGN PATENT DOCUMENTS 1379955  10/1964  France .................. 222/650

Primary Examiner—Michael S. Huppert
Assistant Examiner—Gregory L. Huson
Attorney, Agent, or Firm—Bruce L. Adams; Van C. Wilks

[57] ABSTRACT

An automatic feeder for tropical fish comprises a rotatable container containing granular feed and a driving device for rotating the container only at preselected times to discharge a predetermined amount of feed from the container. A switch turns on a drive motor at the preselected times to rotate the container, and a pre-settable timer controls the actuation of the switch. The container has a rectangular shape and is divided into a feed-receiving portion and a feed-discharge portion which communicate with each other through an adjustable opening. Rotation of the container through one revolution causes a predetermined amount of feed to flow from the feed-receiving portion through the opening into the feed-discharge portion for discharge from the container.

29 Claims, 5 Drawing Sheets

5,037,018

AUTOMATIC FEEDER

DETAILED DESCRIPTION OF THE INVENTION

1. Field of the Invention

The present invention relates to an automatic feeder for automatically supplying a given amount of granular feed at each of predetermined times.

2. Prior Art and Problem to be Solved by the Invention

An example of granular feed is feed for goldfish and tropical fish. Since such feed for goldfish and tropical fish must be supplied in a given amount at each of predetermined times, it is very troublesome to take out a given amount of feed from a feed box at each of the predetermined times. There are also troubles in that an excessive amount of feed is mistakenly supplied and feeding is forgotten owing to the pressure of daily work. A particular problem is that goldfish and tropical fish will sometimes die if feed cannot be supplied in the case of absence from home for a long period.

OBJECT OF THE INVENTION

Accordingly, it is an object of the present invention to provide a small automatic feeder which is at a low cost and can be easily used in the home.

It is another object of the present invention to enable a given amount of feed received in a receiving container to be always discharged regardless of the amount of feed received.

MEANS FOR SOLVING THE PROBLEM

The present invention is mainly characterized by comprising a receiving container for receiving granular feed, a rotational shaft to which the receiving container is connected, a driving motor which causes the rotational shaft to rotate, and a timer mechanism which starts the driving motor at a time set in a timer and stops the driving motor when the rotational shaft rotates through one rotation, the receiving container comprising a discharge port which is opened in a portion of one side wall thereof, and a partition wall which inwardly extends from the edge of the discharge port and which functions to partition the receiving container into a part for receiving the granular feed and a discharge path, the receiving part and the discharge path communicating with each other through a communicating hole formed by cutting out the end portion of the partition wall, an adjusting member for adjusting the width of an opening of the communicating hole slidably contacting the partition wall.

The present invention is further characterized in that a projection is provided on the inner wall of the receiving container near the communicating hole.

Function

The granular feed received in the receiving part flows into the discharge path through the communicating path when the receiving container is caused to rotate. The amount of the granular feed which flows into can be adjusted by previously adjusting the width of the opening of the communicating hole by operating the adjusting member. The granular feed which flows into the discharge path is discharged from the discharge port to the outside when the receiving container is further rotated.

In the case in which a projection is provided on the inner wall of the receiving wall near the communicating hole, the flow of the feed is divided into two portions by the projection and the adjusting member when the receiving container rotates. One of the portions of the feed flows into the discharge path, and the other is returned into the receiving part.

BRIEF DESCRIPTION OF THE DRAWINGS

The drawings concern an embodiment of the present invention, in which.

PREFERRED EMBODIMENT OF THE INVENTION

An embodiment of the present invention is described below with reference to the drawings.

Figure 1:
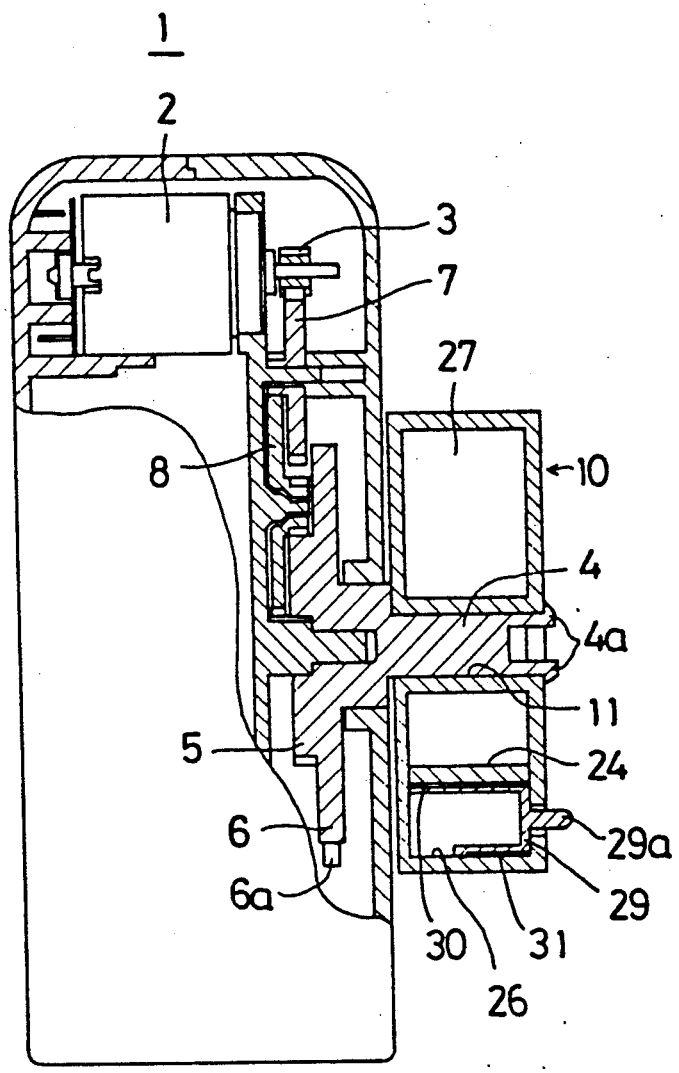
FIG. 1 is a cut-away, sectional view of a mechanism for causing a receiving container to rotate.

As shown in FIG. 1, a driving motor 2 is provided in an apparatus body 1 and has a driving shaft to which a pinion 3 is secured. A rotational shaft 4 is formed integrally with a gear 5 and a rotating plate 6 and an engagement projection 6a which form the stop mechanism described below and is caused to rotate by the driving motor 2 through the pinion 3 and a row of driving wheels comprising gears 7, 8 and 5. The rotational shaft 4 has a rectangular cross-sectional form (not shown) and an end at which elastic claws 4a, 4a are formed. A container 10 for receiving granular feed 9 (shown in FIG. 6) engages with the rotational shaft 4 through a rectangular central hole 11 (shown in FIG. 5) so as to be unable to relatively rotate, whereby the container is not separated from the rotational shaft 4 by virtue of the elastic claws 4a, 4a which engage with the edge of the central hole 11.

A description will now be given of a timer mechanism T with reference to FIG. 2.

A known clock machine member 12 is provided in the apparatus body 1 and has an hour shaft 12a which rotates through one rotation every 12 hours. A gear 13 fixed to the hour shaft 12a engages with a gear 14, and a pinion 14a engages with a pinion 15a which is formed in a boss of a timer time setting plate 15. The timer time setting plate 15 is thus caused to rotate through one rotation every 24 hours in the direction shown by the arrow $A_1$ in FIG. 3. A timer time correcting lug 16 is secured on a minute shaft 12b. As shown in FIG. 3, concave portions 15c are formed at the peripheral edge 15b of the time setting plate 15 at intervals corresponding to 10 minutes, and numerals of time (not shown) are printed on the surface of the time setting plate 15 in correspondence with the concave portions 15c. A substantially U-shaped time setting piece 17 detachably holds each of the concave portions 15c. The time setting piece 17 can engage with a first cam 18 having a substantially crucial shape. The cam 18 is caused to rotate 45° in the direction shown by the arrow $A_2$ in FIG. 3 by the engagement with the time setting piece 17. As shown in FIG. 2, the shaft of the cam 18 is press fitted in one end of the shaft of a second cam 19 having a slightly large crucial shape, the phases of the two cam being the same. A driving switch 20 is a switch for the driving motor 2, the switch lever 20a thereof being press contacting the cam 19 by virtue of its own elastic force. The cam 19 45° rotates while interlocking with the cam 18 in the direction shown by the arrow $A_2$ in FIG. 3 so as to actuate the switch lever 20a by using a pressure portion 19a thereof which presses the switch lever 20a, whereby driving the driving motor 2.

If a desired timer time is set by mounting the time setting piece 17 on one of the concave portions 15c corresponding to the desired set time, the time setting piece 17 engages with the cam 18 after a give time has passed. Consequently, the cam 18 and the cam 19 rotate, and the driving switch 20 is closed so as to start the driving motor 2.

Figure 2:
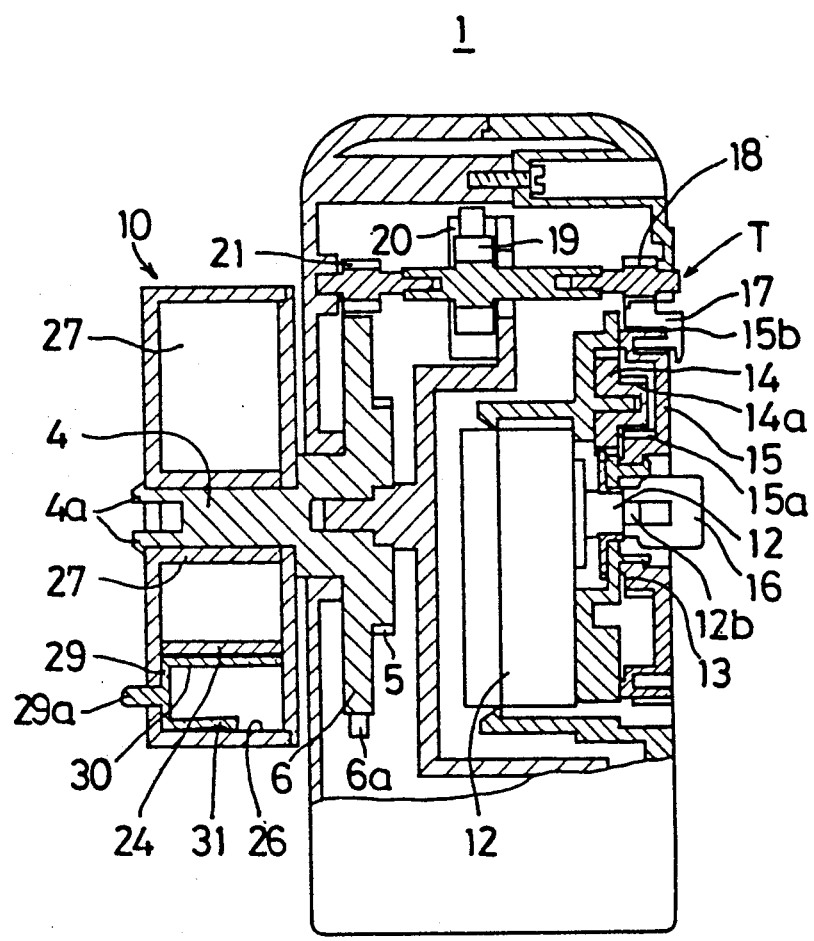
FIG. 2 is a cut-away, sectional view of the arrangement of a timer mechanism.
Figure 3:
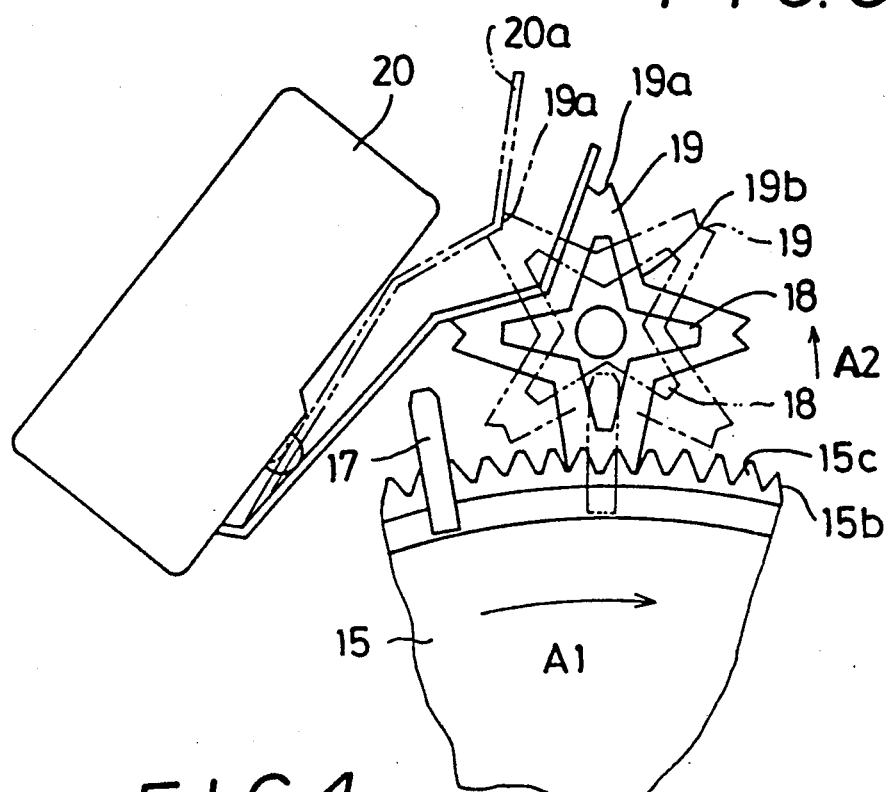
FIG. 3 is a front view of a principal portion of a timer mechanism.
Figure 4:
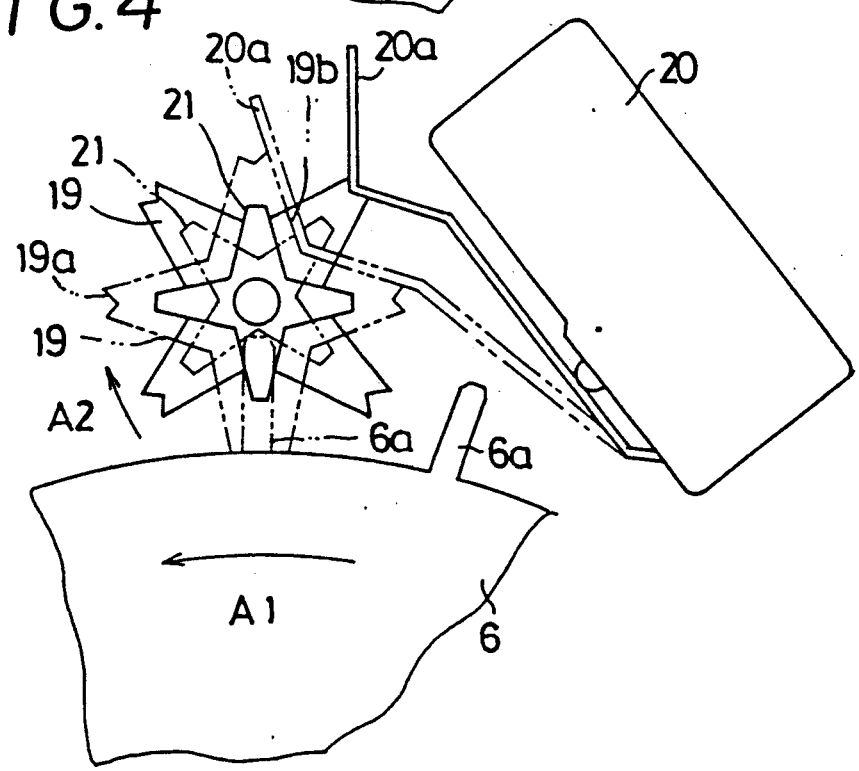
FIG. 4 is a rear view of the same principal portion.

As shown in FIG. 2, a third cam 21 is press fitted at the other end of the shaft of the cam 19. As shown in FIG. 4, the cam 21 has the same shape as that of the first cam 18 and a phase which 45° deviates from those of the fist and second cams. An engagement projection 6a which can engage with the cam 21 is projected from the outer periphery of the rotating plate 6. The engagement projection 6a engages with the cam 21 each time the rotating plate 6 rotates through the driving motor 2 in the direction shown by the arrow $A_1$ (that is, in the same direction as that of the timer time setting plate 15. The arrows shown in FIGS. 3 and 4 are reverse to each other because these drawings are reverse to each other.) so as to cause the cam 21 to 45° rotate in the direction shown by the arrow $A_2$. The cam 19 also 45° rotates while interlocking with the cam 21, and the switch lever 20a of the driving switch 20 falls in the concave portion 19b so that the driving switch 20 is opened, whereby the driving motor 2 is stopped. At this time, the positions of the cams 18, 19, 21 are returned to the initial states (shown by the solid lines in FIG. 3 and the chain lines in FIG. 4).

The receiving container 10 is described below.

Figure 5:
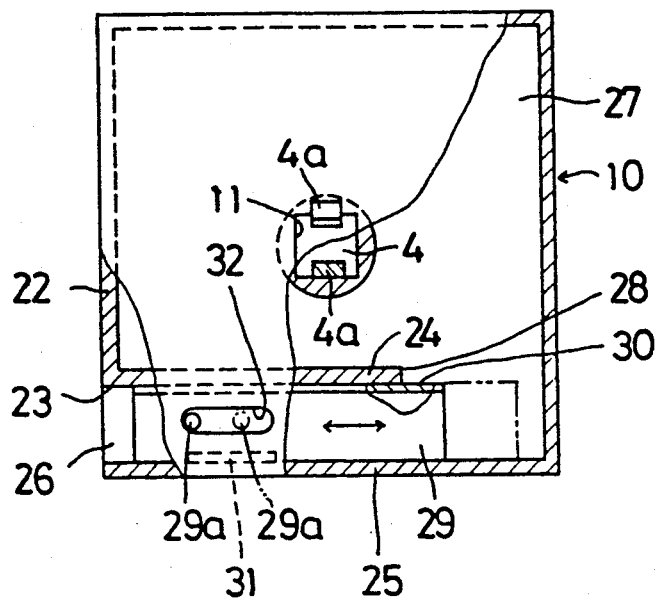
FIG. 5 is an explanatory view of the rotational operation of a receiving container.
Figure 6:
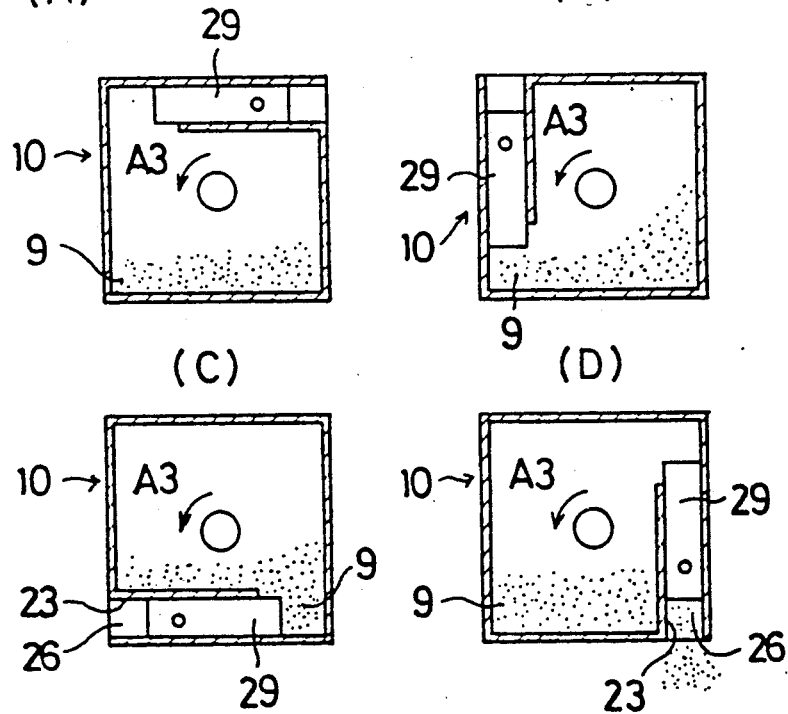
FIG. 6 is a sequential sectional view of another receiving container rotating through an operation from A to D.

As shown in FIG. 5, a discharge port 23 for the granular feed 9 (shown in FIG. 9) is opened in a lower end portion of a side wall 22 of the receiving container 10. A partition wall 24 inwardly extends in the receiving container 10 from the upper edge of the discharge port 23. The partition wall 24 constitutes a discharge path 26 in combination with the opposite side wall 25. The end of the partition wall 24 is cut off to form a communicating hole 28 through which the discharge path 26 and a receiving part 27 communicate with each other. An adjusting member 29 for adjusting the width of the opening of the communicating hole 28 is slidably fitted in the discharge path 26. In the adjusting member 29 is formed a sliding wall 30 which slides on the lower surface of the partition wall 24. (refer to FIGS. 1 and 2). The sliding adjustment of the adjusting member 29 enables adjustment of the length of the portion of the sliding wall 30 which projects in the communicating hole 28 and thus adjustment of the width of the opening of the communicating hole 28. In the adjusting member 29 is also formed an elastic piece 31 (refer to FIGS. 1 and 2) opposing the sliding wall 30, the elastic piece 31 serving to hold the adjusting member 29 at a given position by virtue of the frictional force between the elastic piece 31 and the side wall 25 and thus to keep a constant width of the opening of the communicating hole 28. An operational lug 29a formed integrally with the adjusting member 29 projects from an elongated hole 32 of the receiving container 10 so that the adjusting member 29 can be operated from the outside.

A description will now be given of the operation.

When the driving switch 20 is closed at a given time by the above-described timer mechanism T, the driving motor 2 is started, and the rotational shaft 4 is caused to rotate. As a result, the receiving container 10 rotates in the direction shown by the arrow $A_3$ in FIG. 6 while being subjected to successive rotational displacement from state (A) to states (B), (C) and (D) and returned to state (A). A given amount of the granular feed 9 flows into the discharge path 26 from the communicating hole 28 in the course of displacement from state (B) to state (C) and is then discharged to the outside through the discharge port 23 in the course of displacement from state (C) to state (D). When the receiving container 10 is caused to further rotate while being displaced from state (D) to state (A), the engagement projection 6a of the rotating plate 6 engages with the cam 21, and the driving switch 20 is opened through the cam 19 so that the driving motor 2 is stopped, whereby the rotation of the receiving container 10 is stopped. Since the granular feed 9 is successively guided by the side walls of the receiving container 10 and flows into the discharge path 26 in the course of rotation of the receiving container 10, no granular feed remains in the receiving container 10.

The amount of feed to be supplied once to fish depends upon the size and the number of fish, and it is necessary to keep a constant amount of feed. However, it was found that there is a deviation in the amount of feed discharged caused by the change in the amount of feed 9 received in the receiving part 27 even if the width of the opening of the communicating hole 28 is adjusted by the adjusting member 29.

A large amount of granular feed 9 is first contained in the receiving part 27, and the discharge port 23 of the receiving container 10 looks upward before the rotation of the receiving container 10. That is, in the state wherein the communicating hole 28 is placed at the bottom, a load is applied to the portion of a large amount of feed received in the container which is placed at the bottom thereof and which thus becomes dense. If the rotation of the receiving container 10 is started in the counterclockwise direction, the feed 9 is not easily transferred to the communicating hole 28 because the feed 9 is subjected to a load.

Most part of the feed 9 discharged is specified to the feed placed in the corner extending from the vicinity of the communicating hole 28 to the discharge path 26.

When the amount of feed gradually decreases to a medium value, the feed placed at the bottom of the receiving part 27 is released from the load applied by the feed placed in an upper portion in the state wherein the discharge port 23 looks upward (in the state wherein the communicating hole 28 is placed at a lower position), as described above. When the receiving container 10 rotates, therefore, the feed 9 continuously flows toward the discharge path 26, resulting in an increase in the amount of the feed discharged.

A description will now be given of an embodiment of the receiving container in which a projection is provided on an inner wall of the receiving container near the communicating hole.

Figure 7:
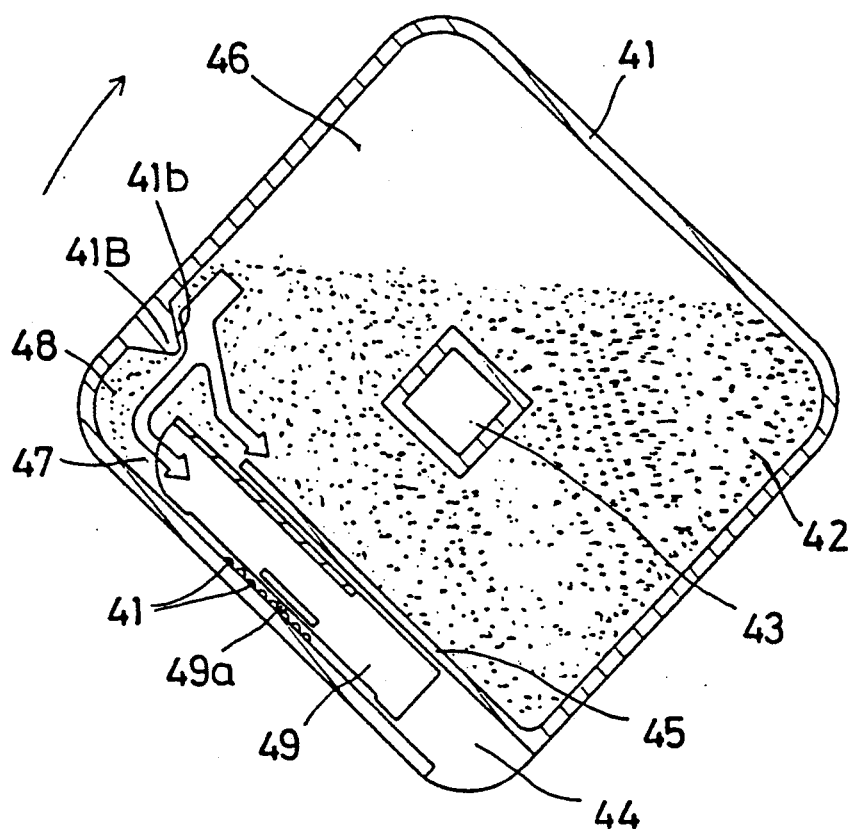
FIG. 7 is another receiving container in section with positioning nibs.

In FIG. 7, a receiving container 41 is used for receiving granular feed 42 and has a central hole which engages with a driving means 43 and which is formed at the center of the container. A discharge port 44 for feed is opened at a portion of one side wall of the receiving container 41, and a partition wall 45 is inwardly extended from the edge of the discharge port so as to partition the interior of the receiving container 10 into a feed receiving part 46 and a discharge path 47 which are caused to communicate with each other through a communicating hole 48 formed by cutting off the end of the partition wall. An adjusting member 49 is brought into slidable contact with the partition wall 45 for the purpose of adjusting the width of the opening of the communicating hole 48.

On the adjusting member 49 is formed a click projection 49a which engages with a plurality of click projections 41a . . . projecting on the receiving container and is fixed at a position so that the width of the opening of the communicating hole 48 can be kept at a constant value.

In addition, a projection 41B is provided at a position in the inner wall of the receiving container 41 which is close to the communicating hole 48, for example, at a small distance from the line extended from the partition wall 45 toward the receiving part 46 (to the upper right as viewed in FIG. 7). The inner surface 41b of the projection 41B has a tapered form in which the extension line thereof is at a certain angle with respect to the partition wall 45.

A description will now be given of the operation of the present invention.

In the state wherein the motor of the rotational driving container 41 is stopped, the discharge path 47 of the receiving container 47 is placed above the receiving part 46, with the discharge port 44 facing to the left. When the feed 42 is supplied to fish, the receiving container 41 is caused to rotate through one rotation by the rotational driving means in which a timer is previously set and then stopped. The rotation of the receiving container 41 starts in the clockwise direction from the state wherein the discharge port 44 faces to the left. As the receiving container 41 rotates, the discharge path 47 is moved to the right of the receiving part 46, and the discharge port 44 turns upward. If the receiving container 47 further rotates, it assumes the state wherein the communicating hole 48 for communicating the receiving part 46 with the discharge path 47 is positioned at the lowermost position of the receiving container 41.

At the same time, the feed 42 received in the receiving part 46 passes through the communicating hole 48, is filled in the corner near the communicating hole 48 and then flows into the discharge path 47. Since the receiving container 41 continuously rotates, the flow of the feed 42 is divided into two parts from the receiving part 46 by the projection 41B and the adjusting member 49. One of the two parts flows into the discharge path 47, and the other is returned into the receiving part 46. This state is shown in FIG. 7.

When the receiving container 41 further rotates, the whole of the feed 41 is guided along the adjusting member 49 and the partition wall 45 by the projection 41B and returned into the receiving part 46. In this state, since the discharge port 44 of the discharge path 47 turns downward, the feed 42 is discharged from the discharge port 44.

When the discharge path 47 is placed above the receiving part 46 with the discharge port 44 facing to the left, the rotation of the receiving container is stopped.

The amount of the feed 42 discharged from the discharge path 47 is limited to the sum of the feed in the vicinity of the communicating hole 48 and a slight amount of the part of the feed which is divided by the projection 41B and flows. The amount of the feed discharged is therefore hardly affected by the change in the amount of the feed contained in the receiving part 46.

The adjusting member is not limited to that employed in the above-mentioned embodiment. Namely, it is possible to use any members which are capable of sliding on the surface of the partition wall and adjusting the width of the opening of the communicating hole and which can be operated from the outside. An example of the member that may be used is one comprising guide projections formed on the inner surfaces of the upper and lower walls of the receiving container and a sliding plate interposed between the guide projections and the partition wall for the purpose of adjusting the width of the opening, an operational lug outwardly projecting being formed on the sliding plate. Although the adjusting member is effective to adjust the amount of feed discharged corresponding to the size and number of fish by adjusting the width of the opening of the communicating hole, if the amount of feed need not be adjusted, the adjusting member also need not be provided. In addition, if the width of the opening is reduced by increasing the length of the partition wall to a value greater than that shown in the drawings, and the discharge of feed is controlled by adjusting the time set in the timer, the adjusting member can be omitted. Although the embodiment of the present invention employs the rectangular receiving container, sectoral, triangular and other angular containers may be used.

As described in detail above, the present invention is capable of automatically supplying granular feed at a time set in a timer and thus removing the trouble of feeding when being used as a feeder for goldfish and tropical fish, as well as removing the trouble in that goldfish and tropical fish will die in the case of absence from home for a long period.

In addition, since the flow of feed is divided by the projection when the feed contained in the receiving part is discharged from the discharge path, and since the whole of the feed is returned to the receiving part by the projection after a given time has passed, a given amount of feed is discharged from the discharge port to the outside regardless of the amount of the feed received in the receiving part.

Further, since the present invention has a very simple arrangement at a low cost, a small size and a light weight, there is advantages in that the location where the feeder is installed is not hindered, and that the feeder of the present invention can be easily carried about.

What is claimed is:

1. An automatic feeder for tropical fishes or the like having a feed container for receiving granular feed and a driving device for rotating said container in order to discharge a certain amount of feed from said container, the combination comprising:
said driving device comprising a device casing, a driving motor disposed in said casing, a rotational shaft driven by said motor and outwardly and horizontally projecting out a rear portion of said casing, and a timer mechanism disposed in said casing and for controlling actuations of said motor at pre-set times, said timer mechanism including setting means located at a front portion of said casing for presetting desired times to discharge feed from said container, said container having a rectangular shape having a discharge port which is opened in a portion of one side wall of said container, a partition wall which inwardly extends from the edge of said discharge port and which functions to partition said container into a receiving part for receiving said granular feed and a discharge path, said receiving part and said discharge path communicating with each other through a communicating hole formed in the end portion of said partition wall, and an adjusting member for adjusting the size of said communicating hole, the member slidably contacting said partition wall.

2. An automatic feeder according to claim 1, wherein a projection is provided on the inner wall of said container near said communicating hole.

3. An automatic feeder comprising:
a displaceable container for receiving animal feed and having discharging means for discharging the animal feed;
driving means operative when activated for displacing the container to effect the discharge of a predetermined amount of animal feed by the discharging means; and
means for activating the driving means only at desired preset times, the means for activating comprising switching means for switching the driving means between activated and non-activated states, movable contacting means for contacting the switching means, engaging means for engaging the contacting means at the preset times thereby enabling the contacting means to contact the switching means at the preset times, and rotating means for rotating the engaging means to engage the contacting means at the preset times.

4. A feeder according to claim 3, wherein the discharging means comprises a sidewall of the container, the sidewall having an opening therein for discharging the feed.

5. A feeder according to claim 3 wherein the contacting means comprises movable cams for contacting the switching means.

6. A feeder according to claim 3 wherein the engaging means comprises detachable time-setting pieces detachably disposed on a periphery of the engaging means to engage the contacting means.

7. A feeder according to claim 3 wherein the rotating means comprises a timekeeping movement for controlling the time of rotation of the engaging means.

8. A feeder according to claim 3 wherein the container has a rectangular shape.

9. A feeder according to claim 3 wherein the driving means has stopping means for stopping the displacement of the container after a predetermined time period.

10. A feeder according to claim 9 wherein the stopping means comprises a rotatable plate having an engagement projection outwardly projecting from a peripheral surface thereof and rotatably driven by the driving means, whereby the rotation of the plate permits the engagement projection to engage the activating means in order to deactivate the driving means after the predetermined time period has elasped.

11. A feeder according to claim 3 wherein the container includes directing means for directing the predetermined amount of animal feed to the discharging means and for directing the remaining animal feed away from the discharging means as the container is displaced.

12. A feeder according to claim 11 wherein the directing means comprises a projection projecting inwardly from an inside wall of the container.

13. A feeder according to claim 3 wherein the container comprises receiving means for receiving the animal feed, and dividing means for dividing the receiving means from the discharging means so that a predetermined amount of animal feed is displaced from the receiving means into the discharging means in response to displacement of the container.

14. A feeder according to claim 13 wherein the dividing means comprises a partition wall inwardly extending from an edge of the discharging means for dividing the receiving means from the discharging means, the partition wall having an opening communicating the receiving means with the discharging means whereby the predetermined amount of animal feed is displaced from the receiving means to the discharging means through the opening in the partition wall.

15. A feeder according to claim 14 wherein the dividing means includes adjusting means for adjusting the size of the opening in the partition wall in order to vary the predetermined amount of animal feed displaced into the discharging means.

16. A feeder according to claim 15 wherein the adjusting means comprises a slidable member slidably attached to a lower portion of the dividing means for varying the size of the opening.

17. A dispenser for dispensing a flowable material at preselected times, comprising:
a container for containing a flowable material during use of the dispenser and having discharging means for discharging a predetermined amount of the material from the container;
means mounting the container to undergo a cycle of motion during which the discharging means discharges the predetermined amount of material from the container;
driving means operative when actuated for driving the container through one cycle of motion, the driving means including a drive motor having a normally off state and being operative when switched to an on state to effect driving of the container through one cycle of motion; and
actuating means for actuating the driving means only at preselected times, the actuating means including switching means for switching the drive motor to the on state at the preselected times, a timekeeping movement for keeping time and providing a rotary output as a function of time, and means driven by the rotary output for actuating the switching means.

18. A dispenser according to claim 17 wherein the means driven by the rotary output comprises a rotary plate member, time-setting members detachably connected to the plate member at positions around the periphery thereof corresponding to the preselected times, and means engageable with the time-setting members at the preselected times for actuating the switching means.

19. A dispenser according to claim 18 wherein the container has means therein separating the interior thereof into a receiving portion for receiving the flowable material and a discharging portion for discharging a predetermined amount of the material from the container, the discharging portion comprising part of the discharging means.

20. A dispenser according to claim 19 wherein the means separating the interior of the container comprises a partition separating the container into the receiving and discharging portions, the partition defining an opening providing communication between the receiving and discharging portions.

21. A dispenser according to claim 20 wherein the discharging means includes means for regulating the amount of material flowing from the receiving portion to the discharging portion to thereby determine the predetermined amount of material discharged from the container.

22. A dispenser according to claim 21 wherein the means for regulating comprises a slidable wall member slidable along the partition to selectively vary the size of the opening between the receiving and discharging portions.

23. A dispenser according to claim 22 wherein the container has a generally rectangular shape defined by four sidewalls, the partition extending parallel to one sidewall, whereby rotation of the container through one cycle of motion causes a predetermined amount of material to flow from the receiving portion through the opening into the discharging portion for discharge from the container.

24. A dispenser according to claim 17 wherein the container has means therein separating the interior thereof into a receiving portion for receiving the flowable material and a discharging portion for discharging a predetermined amount of the material from the container, the discharging portion comprising part of the discharging means.

25. A dispenser according to claim 24 wherein the means separating the interior of the container comprises a partition separating the container into the receiving and discharging portions, the partition defining an opening providing communication between the receiving and discharging portions.

26. A dispenser according to claim 25 wherein the container includes a projection projecting inwardly thereof in the region of the opening to assist in directing a predetermined amount of material through the opening into the discharging portion and directing the remaining material away from the opening as the container moves through one cycle of motion.

27. A dispenser according to claim 25 wherein the discharging means includes means for regulating the amount of material flowing from the receiving portion to the discharging portion to thereby determine the predetermined amount of material discharged from the container.

28. A dispenser according to claim 27 wherein the means for regulating comprises a slidable wall member slidable along the partition to selectively vary the size of the opening between the receiving and discharging portions.

29. A dispenser according to claim 28 wherein the container has a generally rectangular shape defined by four sidewalls, the partition extending parallel to one sidewall, whereby rotation of the container through one cycle of motion causes a predetermined amount of material to flow from the receiving portion through the opening into the discharging portion for discharge from the container.

* * * * *